United States Patent [19]

Nishizawa et al.

[11] Patent Number: 4,516,154

[45] Date of Patent: May 7, 1985

[54] SOLID STATE COLOR IMAGING SYSTEM

[75] Inventors: Shigeki Nishizawa, Kodaira; Shusaku Nagahara, Hachioji; Naoki Ozawa, Kokubunji, all of Japan

[73] Assignee: Hitachi, Ltd., Tokyo, Japan

[21] Appl. No.: 407,484

[22] Filed: Aug. 12, 1982

[30] Foreign Application Priority Data

Aug. 19, 1981 [JP] Japan .................................. 56-128761

[51] Int. Cl.³ .............................................. H04N 9/07
[52] U.S. Cl. ................................................... 358/44
[58] Field of Search ...................... 358/41, 43, 45, 47, 358/44, 48

[56] References Cited

U.S. PATENT DOCUMENTS 4,042,956  8/1977  Yamanaka ............................. 358/41
4,071,853  1/1978  Yamanaka ............................. 358/41
4,288,812  9/1981  Rhodes .................................. 358/44

Primary Examiner—Michael A. Masinick
Attorney, Agent, or Firm—Antonelli, Terry & Wands

[57] ABSTRACT

In a solid state color imaging system comprising a two-dimensional array of photoelectric devices, the photoelectric device in one of two adjacent rows are displaced with respect to those in the other row in the horizontal direction by half a horizontal pitch of the photoelectric devices, and the respective color filter elements associated with three photoelectric devices adjacent to one another in the two rows have such spectrum characteristics that the sum of outputs from the three photoelectric devices substantially corresponds to a luminance signal, whereby Moiré is suppressed and high quality color pictures are obtained.

10 Claims, 6 Drawing Figures

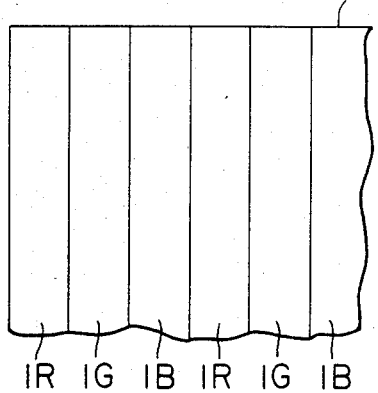
FIG. 1
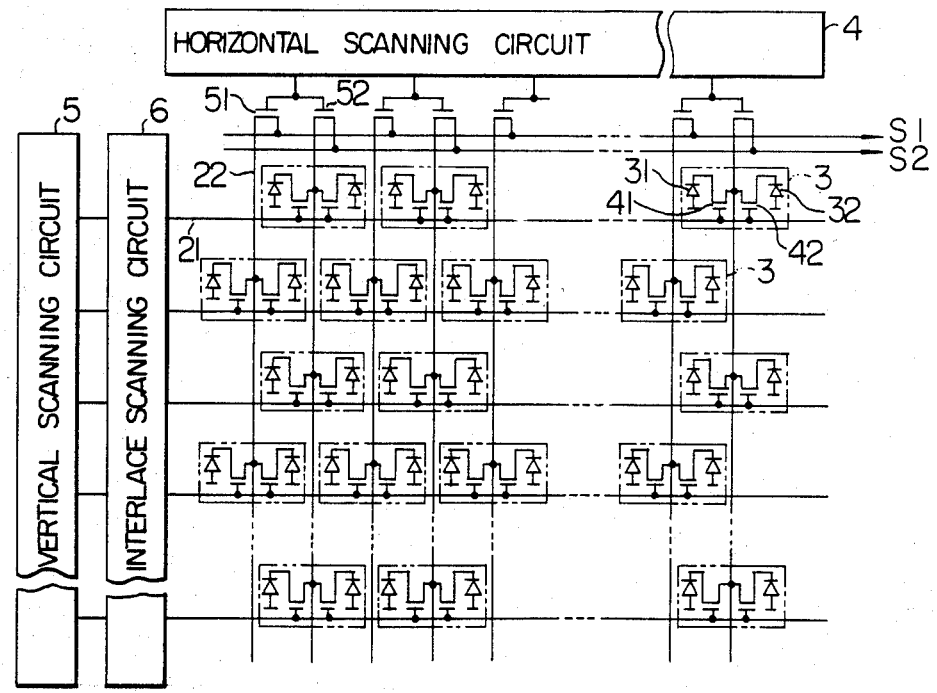
FIG. 2
FIG. 3

SOLID STATE COLOR IMAGING SYSTEM

BACKGROUND OF THE INVENTION

This invention relates to a solid state color imaging system which produces color video signals by sequentially reading out signal charges that are stored in a number of photoelectric devices responsive to light from an object, and more particularly to an improvement of the solid state color imaging system which can reduce Moiré to reproduce pictures of high quality.

Conventionally, an image pickup or camera tube has been used for conversion of light from an object into video signals but in recent years, a solid state image sensor has also been used in this field of art. Various types of solid state image sensors are known. Usually, a number of photoelectric elements such as photodiodes are two-dimensionally arranged in a light sensitive area and signal charges stored in the photoelectric elements are sequentially read out. Charge transfer or coupled devices may be used as the photoelectric elements. In general, signal charges stored in the photoelectric elements in a given horizontal scanning line (or in a given row) are sequentially read out through a signal output line coupled with vertical scanning lines. Alternatively, a charge transfer or coupled device may be connected with the vertical scanning lines for reading out the signal charges to transfer them to its output port. The construction and operation of the above arrangements are well known in the art and hence a further explanation will be omitted.

Different from the image pickup tube, the solid state image sensor does not use deflection coils or plates for electron beam deflection and consequent analog scan but uses clock pulses for digital scan. Accordingly, linearity of scanning is excellent and addresses on the scanned photoelectric plane of the image sensor can readily be related to the electrical signal output.

In constructing a color imaging system with such a solid state image sensor, an optical image is decomposed into three color images by means of a color separation optical system (including prisms or dichroic mirrors), and three image sensors each having a number of photoelectric elements are provided to the respective color images. In this case, the color separation optical system employed is complicated, large-sized and expensive, resulting in impairment of the advantage due to the utilization of the solid state iamge sensor. Further, very stringent standards are disadvantageously required of the color separation optical system in respect of dimensional precision and aberration because linearity and width of scanning are fixed in the digital scan.

Under the circumstances, a stripe color filter arrangement adapted to spacially sample light from an object has been proposed in order that the color separation system may be simplified and the system can be constructed with a single image sensor.

More particularly, it has been proposed to combine a strip color filter 1 comprised of filter elements 1R, 1G and 1B for red, green and blue colors as shown in FIG. 1 with three groups of photoelectric elements (not shown). With such a stripe color filter, however, a profile interferes with the stripe color filter to develop Moiré when imaging an object of, for example, scenery which is crowded with electric poles or chimneys, and picture quality is terribly degraded.

SUMMARY OF THE INVENTION

An object of this invention is to provide an improved solid state color imaging system capable of reducing Moiré and producing high-resolution video signals.

To accomplish the above object, according to the invention, there is provided a solid state color imaging system comprising a number of photoelectric devices arranged regularly and two-dimensionally, and a color filter having filter elements respectively associated with the photoelectric devices, characterized in that the photoelectric devices in one of vertically adjacent photoelectric device rows are displaced with respect to those in the other row in the horizontal direction by half a horizontal pitch of the photoelectric devices, and the spectrum characteristics of the respective color filter elements associated with three photoelectric devices adjacent to one another in two vertically adjacent photoelectric device rows that the sum of outputs from the three photoelectric devices substantially corresponds to a luminance signal.

The solid state color imaging system with the above-described arrangement of color filter elements and photoelectric devices can suppress generation of Moiré and produce high-resolution video signals, thereby ensuring high quality color pictures.

BRIEF DESCRIPTION OF THE DRAWINGS

FIG. 1 is a diagram showing a prior art stripe color filter;

FIG. 2 is a diagram showing a color filter used for a solid state color imaging system according to the invention;

FIG. 3 is a block diagram showing the arrangement of photoelectric devices in the solid state imaging system according to the invention;

DESCRIPTION OF PREFERRED EMBODIMENTS

Figure 4:
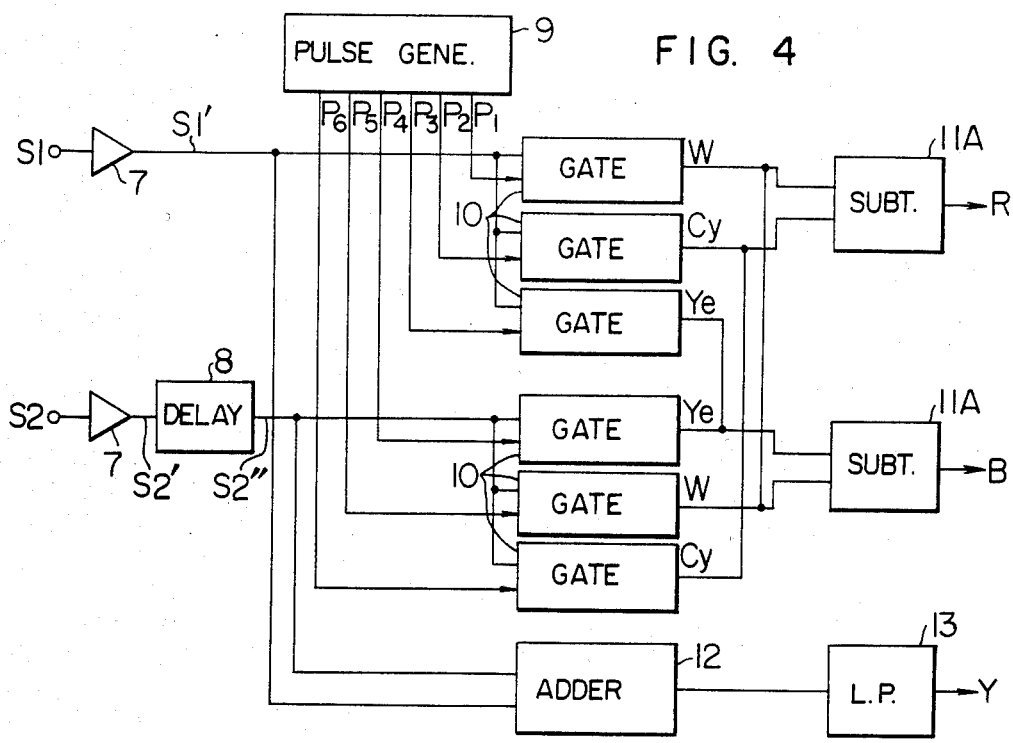
FIGS. 4 and 5 are block diagrams showing examples of a signal processing circuit in the solid state imaging system according to the invention.

The generation of Moiré accruing from interference of a profile of an object with the color filter is remarkable when spatial frequencies of the profile and the color filter are substantially identical with other. Therefore, it is possible to suppress the generation of Moiré by increasing the spatial frequency of the color filter. To this end, an arrangement to compensate the information between two columns (or vertical lines) is desirable. On the other hand, there needs groups of color filter elements for at least three colors in order to obtain signals necessary for color reproduction. It will therefore be appreciated that Moiré can be reduced to produce high-resolution video signals if with a set of the photoelectric devices arranged to compensate the information between two columns are associated with complementary color filter elements which can decrease a change in signal between adjacent picture elements.

Exemplified in FIG. 2 is an arrangement to compensate the information between two columns which is materialized in terms of cyan (Cy) color filter element, yellow (Ye) color filter element and panchromatic transmission or white (W) complimentary color filter element. Taking photoelectric elements of MOS type, for instance, their sensitivity to spectra of red, green and blue primary colors R, G and B is given by R:G:B≈4:5:1 so that the sum of signals from the photoelectric elements associated with the Cy, Ye and W filter elements 2Cy, 2Ye and 2W produced when two rows of photoconductive elements are read simultaneously, can directly be used to represent a luminance signal Y=0.32R+0.6G+0.08B, which approximates the luminance signal pursuant to the NTSC system. More particularly, the W filter element provides 0.3R+0.3G+0.3B, the Ye filter element provides 0.3R+0.3G and the Cy filter element provides 0.3G+0.3B. Therefore, the combination thereof provides R:G:B=0.6:0.9:0.6=2:3:2. On the other hand, the sensitivity of the photoelectric element is R:G:B=4:5:1. Accordingly, the resulting ratio of R:G:B is 2×(4/10):3×(5/10):2×(1/10)=8:15:2=0.32:0.6:0.08. The luminance signal produced from each of the trios of the tri-color filter elements [2W(1.1), 2Cy(2.1), 2Ye(2.2)], [2W(1.1), 2Cy(1.2), 2Ye(2.2)], [2W(2.3), 2Cy(1.2), 2Ye(2.2)], ... appears at a period of half a pitch between horizontally adjacent picture elements. Thus, high resolution video signals can be obtained by using a suitably selected sampling frequency.

In place of the W filter element, a green (G) filter element may be used. In this case, the sum of signals from the photoelectric elements associated with the Cy, Ye and G filter elements produced when two rows are read simultaneously can directly be used to represent a luminance signal Y=0.2R+0.75G+0.05B which also approximates the luminance signal pursuant to the NTSC system.

The invention will now be described by way of embodiments.

FIG. 2 shows a color filter used for a solid state color imaging system according to the invention. The color filter, generally designated by reference numeral 2, has color filter elements 2Cy, 2Ye and 2W for cyan, color transmission, yellow color transmission and panchromatic transmission or white color transmission of a small area. In particular, each one of the three color filter elements 2Cy, 2Ye and 2W adjoins the other two elements in two adjacent rows. FIG. 3 shows an arrangement of photoelectric devices 3 constituting an imaging plane of a solid state imaging system, in which the respective photoelectric devices 3 are associated with the respective color filter elements 2Cy, 2Ye and 2W. A horizontal scanning circuit 4, a vertical scanning circuit 5 and an interlace scanning circuit 6 which are necessary for time series production of video signals from the photoelectric devices 3 are conventionally well known. In some applications, the interlace scanning circuit 6 is not required.

In FIG. 3, numeral 21 and 22 designate horizontal and vertical signal lines, respectively. Each photoelectric device 3 is shown to include two photodiodes 31 and 32 coupled with MOS transistor switches 41 and 42. This two-photodiode and two-switch arrangement is employed considering a proper layout of the vertical signal line 22. In principle, the photoelectric device 3 may be constructed by one photodiode plus one MOS transistor switch. For the selection of the photoelectric device 3 and the transfer of charge signals therefrom, the gates of the MOS transistor switches 41 and 42 are commonly connected to the horizontal signal line 21 while the drains thereof are commonly connected to the vertical signal line 22. MOS transistor switches 51 and 52 with gates thereof connected commonly to the horizontal scanning circuit 4 provide for selecting two adjacent vertical signal lines 22 to transfer on two signal output lines S1 and S2 the charge signals transferred to the vertical signal lines 22. Since the arrangement and operation of the image sensor shown in FIG. 3 are well known except the spacial arrangement of the photoelectric devices 3 (and hence color filter elements), further explanation will be omitted.

With the color filter 2 constructed as above, unlike the spectra produced from the stripe color filter as shown in FIG. 1 which are intensive only in the horizontal scanning direction, the spectra are scattered obliquely in right and left directions so that the generation of Moiré can be suppressed and high quality pictures can be reproduced.

Figure 6:
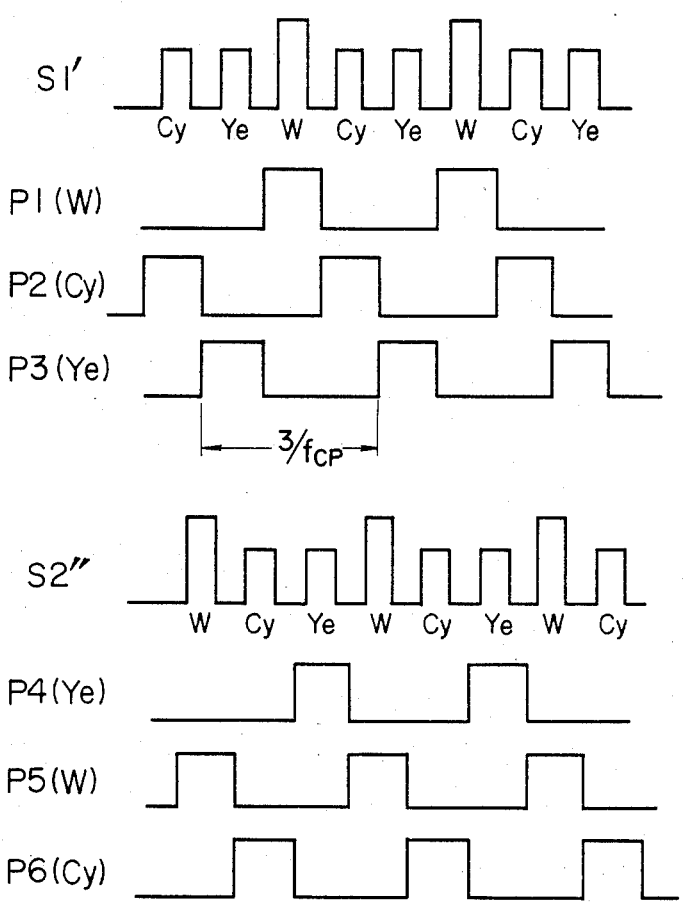
FIG. 6 is a waveform diagram showing waveforms appearing in the block diagram of FIG. 4.

FIG. 4 shows an example of a circuit for processing the video signals from the solid state image sensor. Because of simultaneous reading of two rows of photoelectric devices, signal trains obtained from the photoelectric devices through the signal output lines S1 and S2 do not correspond to the spacial arrangement of photoelectric devices. Therefore, after they are amplified at pre-amplifiers 7, S2′ of the amplified signal trains S1′ and S2′ is delayed in a delay circuit 8 by $\frac{1}{2}f_{cp}$ ($f_{cp}$: a frequency of clock pulses from the horizontal scanning circuit 4), and as a result the combination of the thus obtained signal trains S1′ and S2″ takes the same arrangement as the spacial arrangement of photoelectric devices 3. Thereafter, the respective signal trains S1′ and S2″ are supplied to sampling gates 10 for separation into signals of cyan, yellow and white. Reference numeral 9 designates a pulse generator which applies sampling pulses P1–P6 to the gates 10. The thus separated color signals of cyan, yellow and white from the gates 10 are supplied to subtractor circuits 11A to produce chrominance signals of red (R=W−Cy) and blue (B=W−Ye). To obtain a luminance signal Y, the signal trains S1′ and S2″ are applied to an adder circuit 12 and then passed through a low-pass filter 13. Waveform appearing in the circuit of FIG. 4 are shown in FIG. 6.

Figure 5:
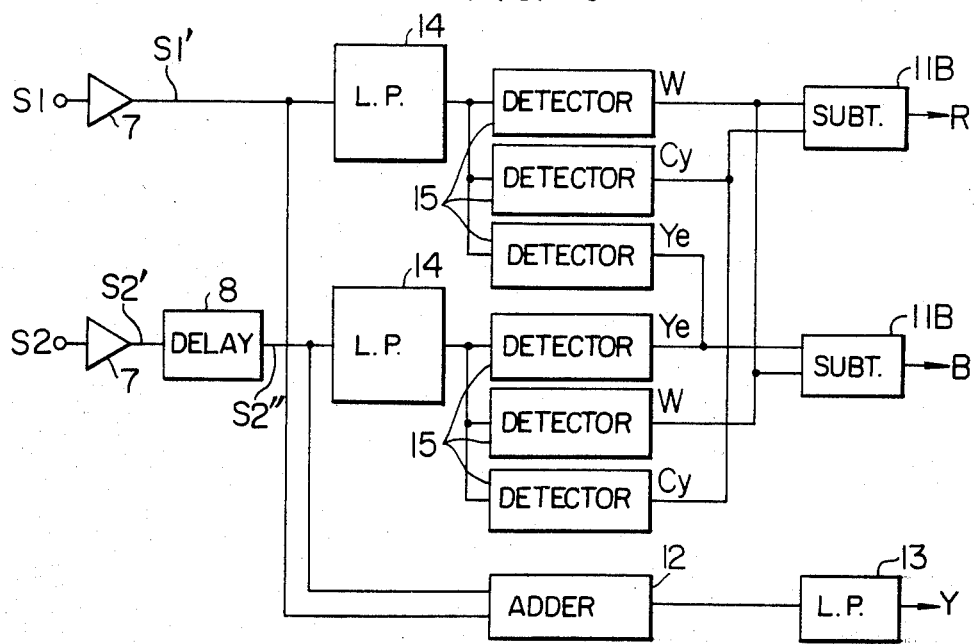

FIG. 5 shows another example of the processing circuit for the video signals from the solid state image sensor. Output signals from the pre-amplifiers 7, of which one is delayed in the delay circuit 8, are passed through low-pass filters 14 for selection of frequency components of signals W, Cy and Ye, and then separated into signals of three colors of cyan, yellow and white at detectors 15 adapted for synchronous detection with phases of the color signals. The thus separated signals are supplied to subtractor circuits 11B to produce chrominance signals of red (R=W−Cy) and blue (B=W−Ye).

When a G filter element substitutes for the W filter element, the subtractor circuit 11A or 11B of the embodiment of FIG. 4 or 5 is adapted for subtraction of R=Ye−G or B=Cy−G, thereby producing a chrominance signal of red or blue. Although, in the foregoing embodiments, two signal output lines S1 and S2 are used, three signal output lines for respective delivery of Ye, Cy and W signals or Ye, Cy and G signals may be used.

We claim:

1. In a solid state color imaging system comprising a number of photoelectric devices arranged regularly and two-dimensionally, horizontal and vertical scanning circuits for controlling the sequential reading of charge signals representative of optical image information from said photoelectric devices onto a signal output line means, and a color filter having filter elements respectively associated with said photoelectric devices, the improvement in that the photoelectric devices in one of any two vertically adjacent photoelectric device rows are displaced with respect to those in the other row in the horizontal direction by half a horizontal pitch of the photoelectric devices, and the three filter elements respectively associated with three photoelectric devices adjacent to one another in said two vertically adjacent photoelectric device rows have transmission characteristics of cyan color transmission, yellow color transmission and panchromatic transmission respectively.

2. A solid state color imaging system according to claim 1, wherein said three filter elements are arranged so that the sum of charge signals from said associated three photoelectric devices substantially provides a luminance signal.

3. A solid state color imaging system according to claim 1, wherein each filter element is associated with a respective photoelectric device, the filter elements in one of any two vertically adjacent filter element rows being displaced with respect to those in the other row in the horizontal direction by half a horizontal pitch of the photoelectric devices, said three filter elements of cyan, yellow and panchromatic transmission characteristic being repeatedly arranged in said order in each filter element row so that each one of said three filter elements only adjoins the other two of said three filter elements in two vertically adjacent filter element rows.

4. In a solid state color imaging system comprising a number of photoelectric devices arranged regularly and two-dimensionally, horizontal and vertical scanning circuits for controlling the reading of charge signals representative optical image information from said photoelectric devices so that the charge signals from the photoelectric devices in one of two vertically adjacent photoelectric device rows and the charge signals from those in the other row are sequentially read out onto first and second signal output lines, respectively, in a simultaneous fashion with respect to said one and other rows, and a color filter having filter means respectively associated with said photoelectric devices, the improvement in that the photoelectric devices in said one row are displaced with respect to those in said other row in the horizontal direction by half a horizontal pitch of the photoelectric devices, the three filter elements respectively associted with three photoelectric devices adjacent to one another in said one and other rows have transmission characteristics of cyan color transmission, yellow color transmission, and panchromatic transmission, respectively, and the charge signals sequentially read out on said first and second signal output lines are supplied to a signal processing circuit which combines them to provide a luminance signal and two color signals necessary for color reproduction, the charge signals on said second signal output line being supplied to said signal processing circuit through a delay circuit which delays the charge signals by a scanning time corresponding to half the horizontal pitch of the photoelectric devices.

5. A solid state color imaging system according to claim 4, wherein each filter element is associated with a respective photoelectric device, the filter elements in one of any two vertically adjacent filter element rows being displaced with respect to those in the other row in the horizontal direction by half a horizonal pitch of the photoelectric devices, said three filter elements of cyan, yellow and panchromatic transmission characteristic being repeatedly arranged in said order in each filter element row so that each one of said three filter elements only adjoins the other two of said three filter elements in two vertically adjacent filter element rows.

6. In a solid state color imaging system comprising a number of photoelectric devices arranged regularly and two-dimensionally, horizontal and vertical scanning circuits for controlling the sequential reading of charge signals representative of optical image information from said photoelectric devices onto a signal output line means, and a color filter having filter elements respectively associated with said photoelectric devices, the improvement in that the photoelectric devices in one of any two vertically adjacent photoelectric device rows are displaced with respect to those in the other row in the horizontal direction by half a horizontal pitch of the photoelectric devices, and the three filter elements respectively associated with three photoelectric devices adjacent to one another in said two vertically adjacent photoelectric rows have transmission characteristics of cyan color transmission, yellow color transmission and green color transmission, respectively.

7. A solid state color imaging system according to claim 6, wherein each filter element is associated with a respective photoelectric device, the filter elements in one of any two vertically adjacent filter element rows being displaced with respect to those in the other row in the horizontal direction by half a horizontal pitch of the photoelectric devices, said three filter elements of cyan, yellow and green transmission characteristic being repeatedly arranged in said order in each filter element row so that each one of said three filter elements only adjoins the other two of said three filter elements in two vertically adjacent filter element rows.

8. A solid state color imaging system according to claim 6, wherein said three filter elements are arranged so that the sum of charge signals from said associated three photoelectric devices substantially provides a luminance signal.

9. In a solid state color imaging system comprising a number of photoelectric devices arranged regularly and two-dimensionally, horizontal and vertical scanning circuits for controlling the reading of charge signals representative optical image information form said photoelectric devices so that the charge signals from the photoelectric devices in one of two vertically adjacent photoelectric device rows and the charge signals from those in the other row are sequentially read out onto first and second signal output lines, respectively, in a simultaneous fashion with respect to said one and other rows, and a color filter having filter means respectively associated with said photoelectric devices, the improvement in that the photoelectric devices in said one row are displaced with respect to those in said other row in the horizontal direction by half a horizontal pitch of the photoelectric devices, the three filter elements respectively associated with three photoelectric devices adjacent to one another in said one and other rows have transmission characteristics of cyan color transmission, yellow color transmission and green color transmission, respectively, and the charge signals sequentially read out on said first and second signal output lines are supplied to a signal processing circuit which combines them to provide a luminance signal and two color signals necessary for color reproduction, the charge signals on said second signal output line being supplied to said signal processing circuit through a delay circuit which delays the charge signals by a scanning time corresponding to half the horizontal pitch of the photoelectric devices.

10. A solid state color imaging system according to claim 9, wherein each filter element is associated with a respective photoelectric device, the filter elements in one of any two vertically adjacent filter element rows being displaced with respect to those in the other row in the horizontal direction by half a horizontal pitch of the photoelectric devices, said three filter elements of cyan, yellow and green transmission characteristic being repeatedly arranged in said order in each filter element row so that each one of said three filter elements only adjoins the other two of said three filter elements in two vertically adjacent filter element rows.

* * * * *